(12) United States Patent
Peng et al.

(10) Patent No.: US 12,332,501 B2
(45) Date of Patent: Jun. 17, 2025

(54) EYEPIECE OPTICAL SYSTEM AND HEAD-MOUNTED DISPLAY DEVICE

(71) Applicant: Shenzhen NED Optics Co., Ltd, Shenzhen (CN)

(72) Inventors: Huajun Peng, Shenzhen (CN);
Hongpeng Cao, Shenzhen (CN);
Jianfei Guo, Shenzhen (CN)

(73) Assignee: Shenzhen NED Optics Co., Ltd, Shenzhen (CN)

( * ) Notice: Subject to any disclaimer, the term of this patent is extended or adjusted under 35 U.S.C. 154(b) by 0 days.

(21) Appl. No.: 18/973,739

(22) Filed: Dec. 9, 2024

(65) Prior Publication Data

US 2025/0102768 A1    Mar. 27, 2025

Related U.S. Application Data

(63) Continuation of application No. PCT/CN2022/098057, filed on Jun. 10, 2022.

(51) Int. Cl.
| | | |
|---|---|---|
| *G02B 9/62* | (2006.01) | |
| *G02B 13/00* | (2006.01) | |
| *G02B 27/01* | (2006.01) | |

(52) U.S. Cl.
CPC ........... *G02B 9/62* (2013.01); *G02B 13/0045* (2013.01); *G02B 27/0172* (2013.01)

(58) Field of Classification Search
CPC ........ G02B 9/62; G02B 9/64; G02B 13/0045; G02B 13/0015; G02B 13/16; G02B 13/18; G02B 27/0025; G02B 27/0012; G02B 27/0172; G02B 15/146; H04N 5/222; H04N 5/2254

USPC ......... 359/656–358, 708, 713, 749, 756–762
See application file for complete search history.

(56) References Cited

U.S. PATENT DOCUMENTS 5,751,495 A    5/1998    Suzuki

FOREIGN PATENT DOCUMENTS

| CN | 106680989 A | 5/2017 |
| CN | 208506365 U | 2/2019 |
| CN | 109725405 A | 5/2019 |
| CN | 210742599 U | 6/2020 |

(Continued)

OTHER PUBLICATIONS

Translation of 112014960 (Year: 2025).*

*Primary Examiner* — Travis S Fissel
(74) *Attorney, Agent, or Firm* — Nitin Kaushik

(57) ABSTRACT

The present invention relates to an eyepiece optical system and a head-mounted display device. The system includes a first lens, a second lens, a third lens, a fourth lens, a fifth lens, and a sixth lens arranged coaxially and sequentially in an optical axis direction from an observation side of human eyes to a micro-image display, and meeting a certain focal length relationship. The first lens, the third lens, and the fourth lens are positive lenses, the second lens and the fifth lens are negative lenses, and material properties of various lenses meet a certain relationship, which effectively alleviates defects of the prior art, and has a better aberration correction ability and better processability, thereby achieving performance indicators such as large field-of-view angle, low distortion, and high optical resolution, reducing the manufacturing difficulty. The eyepiece optical system of the present invention is suitable for head-mounted displays and similar devices.

12 Claims, 20 Drawing Sheets

(56) References Cited

FOREIGN PATENT DOCUMENTS

| | | | |
|---|---|---|---|
| CN | 112014960 A | * | 12/2020 |
| CN | 214011608 U | | 8/2021 |
| JP | H09297271 A | | 11/1997 |
| JP | 2001272610 A | | 10/2001 |
| JP | 2013088632 A | | 5/2013 |
| WO | WO2021217618 A1 | | 11/2021 |

* cited by examiner

EYEPIECE OPTICAL SYSTEM AND HEAD-MOUNTED DISPLAY DEVICE

CROSS-REFERENCE TO RELATED APPLICATIONS

The application is a U.S. National Application of PCT Application Serial NO. PCT/CN2022/098057, filed on Jun. 10, 2022, the entire contents of which are incorporated herein by reference.

TECHNICAL FIELD

The present invention relates to the field of optical technologies, and more specifically, to an eyepiece optical system and a head-mounted display device.

BACKGROUND

A head-mounted display device uses the optical technologies to guide video image light emitted by a micro-image display (such as a transmissive or reflective liquid crystal display screen, an organic electroluminescent device, and a DMD device) to pupils of a user, thereby achieving virtual and enlarged images within a range close to the eyes, and providing the user with intuitive and visual images, videos, and text information. It is applicable in outdoor, simulated driving, training, demonstration, teaching, training, medical, flight, and other scenarios.

With the continuous advancement of the optical technologies, requirements for high definition, low distortion, and other rigid performance indicators of an eyepiece optical system of a head-mounted display device are also constantly increasing. Under the existing basic processing capabilities, an eyepiece optical system needs to achieve indicators such as large field-of-view angle, high definition, and low distortion as much as possible, while meeting the above optical performance requirements is a great challenge for system design and aberration optimization.

There are common eyepiece optical systems each combined and constructed by a plurality of lenses, and many literatures propose their own designs based on this structure. Patent Literature 1 (Chinese Patent Publication No. CN108375829A) and Patent Literature 2 (Chinese Patent Publication No. CN210243956U) each adopt an optical system composed of five lenses and achieve good processability, but performance indicators of the above optical systems are poor.

Patent Literature 3 (Chinese Patent Publication No. CN112731666A) discloses an eyepiece optical system composed of six lenses, which achieves performance indicators such as large field-of-view angle, high image quality, and low distortion. However, the eyepiece optical system largely relies on a complex Fresnel optical face shape, and therefore, it is poor in processability and difficult in mass production.

Patent Literature 4 (Chinese Patent Publication No. CN101609208A) discloses an eyepiece optical system composed of six lenses, which achieves the effect of a large field-of-view angle, but its aberration correction is poor and its performance indicators are poor.

SUMMARY

A technical problem to be solved by the present invention is to provide an eyepiece optical system and a head-mounted display device in response to the above defects of the prior art.

To solve the technical problem, the present invention adopts the following technical solution:

an eyepiece optical system is constructed, including a first lens, a second lens, a third lens, a fourth lens, a fifth lens, and a sixth lens arranged coaxially and sequentially in an optical axis direction from an observation side of human eyes to a micro-image display;

wherein an effective focal length of the first lens is $f_1$, and $f_1$ is a positive value, an effective focal length of the second lens is $f_2$, and $f_2$ is a negative value, an effective focal length of the third lens is $f_3$, and $f_3$ is a positive value, an effective focal length of the fourth lens is $f_4$, and $f_4$ is a positive value, an effective focal length of the fifth lens is $f_5$, and $f_5$ is a negative value, an effective focal length of the sixth lens is $f_6$, and an optical focal length of the eyepiece is F, and $f_1$, $f_2$, $f_3$, $f_4$, $f_5$, $f_6$, and F meet the following relational expressions (1), (2), (3), (4), (5), and (6):

$$0.86 \le f_1/F \le 1.42; \quad (1)$$
$$-1.57 \le f_2/F \le -0.61; \quad (2)$$
$$1.20 \le f_3/F \le 1.70; \quad (3)$$
$$1.07 \le f_4/F \le 1.48; \quad (4)$$
$$-3.70 \le f_5/F \le -1.19; \quad (5)$$
$$-15.65 \le f_6/F \le 52.00; \quad (6)$$

material properties of the various lenses in the eyepiece optical system meet the following relational expressions (7) and (8):

$$1.53 \le Nd \le 1.89; \quad (7)$$
$$20.40 \le Vd \le 63.96; \quad (8)$$

wherein Nd is a refractive index of each lens in the eyepiece optical system on a d-line, and Vd is an Abbe number of each lens in the eyepiece optical system on the d-line.

Further, the effective focal length of the first lens is $f_1$, the effective focal length of the third lens is $f_3$, the effective focal length of the fourth lens is $f_4$, and $f_1$, $f_3$, and $f_4$ meet the following relational expressions (9) and (10):

$$0.96 \le f_3/f_1 \le 1.78; \quad (9)$$
$$0.88 \le f_4/f_1 \le 1.35. \quad (10)$$

Further, the effective focal length of the second lens is $f_2$, the effective focal length of the fifth lens is $f_5$, and $f_2$ and $f_5$ meet the following relational expression (11):

$$0.76 \le f_5/f_2 \le 6.10. \quad (11)$$

Further, the first lens is a biconvex lens.

Further, the second lens, the third lens, the fifth lens, and the sixth lens are all biconcave lenses, the optical surfaces of the second lens and the third lens are all convex towards the micro-image display side, and the optical surfaces of the fifth lens and the sixth lens are all convex towards the human eye side.

Further, an optical surface of the fourth lens close to the human eye side is convex towards the human eye side.

Further, a curvature radius of the optical surface of the sixth lens close to the human eye side is $R_{61}$, and a curvature radius of the optical surface of the sixth lens away from the human eye side is $R_{62}$, and $R_{61}$ and $R_{62}$ meet the following relational expression (12):

$$0.99 \leq R_{61}/R_{62} \leq 1.49. \quad (12)$$

Further, the effective focal length of the sixth lens is $f_6$, and $f_6$ meets the following relational expression (13):

$$46.61 \leq |f_6|. \quad (13)$$

Further, the first lens, the second lens, the third lens, the fourth lens, the fifth lens, and the sixth lens are made of a plastic resin material or a glass material.

Further, the optical surfaces of the first lens, the second lens, the third lens, the fourth lens, the fifth lens, and the sixth lens are all even-order aspherical surfaces, and the even-order aspherical surfaces meet the following relational expression (14):

$$z = \frac{cr^2}{1+\sqrt{1-(1+k)c^2r^2}} + \alpha_2 r^2 + \alpha_4 r^4 + \alpha_6 r^6 + \cdots; \quad (14)$$

wherein z is a vector height of the optical surface, c is a curvature at an aspherical vertex, k is an aspherical coefficient, $\alpha_2$, $\alpha_4$, $\alpha_6$, . . . are coefficients of various orders, and r is a distance coordinate from a point on a curved surface to an optical axis of the lens system.

The present invention further provides a head-mounted display device, including a micro-image display and an eyepiece, the eyepiece being located between human eyes and the micro-image display, wherein the eyepiece is the eyepiece optical system according to any one of the foregoing items.

Further, the micro-image display is an organic electroluminescent device or a transmissive liquid crystal display.

Further, the head-mounted display device includes two identical eyepiece optical systems arranged symmetrically.

The present invention has the following beneficial effects that: the eyepiece optical system adopts a structure of six lenses, wherein the first lens, the second lens, the third lens, the fourth lens, and the fifth lens are arranged in a "positive, negative, positive, positive, negative" combination, in conjunction with focal length combinations between the various lenses and material properties, which effectively alleviates the defects of the prior art, and has a better aberration correction ability and better processability, thereby achieving performance indicators such as a large field-of-view angle, low distortion, and high optical resolution, reducing the manufacturing difficulty, manufacturing cost, and product weight of the eyepiece optical system, and greatly improving the optical performance of the system and the user experience of the product. Observers can view large-format images having full-frame high-definition, no distortion, and uniform image quality through the eyepiece optical system of the present invention, thereby achieving the visual experience with a high sense of presence.

BRIEF DESCRIPTION OF THE DRAWINGS

In order to more clearly illustrate the embodiments of the present invention or technical solutions in the prior art, the present invention will be further described hereafter with reference to accompanying drawings and embodiments. The accompanying drawings in the following description are only some embodiments of the present invention, and those of ordinary skill in the art can still derive other drawings from these accompanying drawings without creative efforts.

DETAILED DESCRIPTION OF THE EMBODIMENTS

Figure 1:
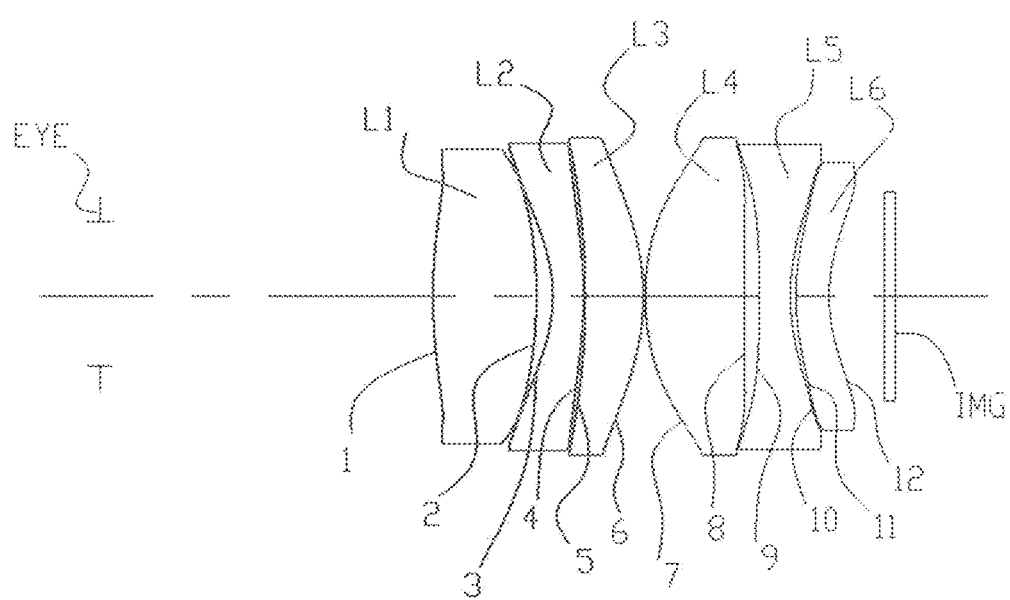
FIG. 1 is a schematic structural diagram of an eyepiece optical system according to Embodiment 1 of the present invention.

In order to make the objectives, technical solutions, and advantages of the embodiments of the present invention clearer, the technical solutions will be clearly and completely described below in connection with the embodiments of the present invention, and apparently, the described embodiments are some embodiments rather than all embodiments of the present invention. All other embodiments obtained by those of ordinary skill in the art based on the embodiments of the present invention without creative efforts fall within the protection scope of the present invention.

An eyepiece optical system is constructed in the present invention, including a first lens, a second lens, a third lens, a fourth lens, a fifth lens, and a sixth lens arranged coaxially and sequentially in an optical axis direction from an observation side of human eyes to a micro-image display;

wherein an effective focal length of the first lens is $f_1$, and $f_1$ is a positive value, an effective focal length of the second lens is $f_2$, and $f_2$ is a negative value, an effective focal length of the third lens is $f_3$, and $f_3$ is a positive value, an effective focal length of the fourth lens is $f_4$, and $f_4$ is a positive value, an effective focal length of the fifth lens is $f_5$, and $f_5$ is a negative value, an effective focal length of the sixth lens is $f_6$, and an optical focal length of the eyepiece is F, and $f_1$, $f_2$, $f_3$, $f_4$, $f_5$, $f_6$, and F meet the following relational expressions (1), (2), (3), (4), (5), and (6):

$$0.86 \leq f_1/F \leq 1.42; \quad (1)$$

$$-1.57 \leq f_2/F \leq -0.61; \quad (2)$$

$$1.20 \leq f_3/F \leq 1.70; \quad (3)$$

$$1.07 \leq f_4/F \leq 1.48; \quad (4)$$

$$-3.70 \leq f_5/F \leq -1.19; \quad (5)$$

$$-15.65 \leq f_6/F \leq 52.00. \quad (6)$$

The value of $f_1/F$ may be 0.86, 0.872, 0.898, 0.995, 1.001, 1.091, 1.151, 1.235, 1.42, and the like. The value of $f_2/F$ may be −1.57, −1.53, −1.5, −1.35, −1.12, −1.08, −0.91, −0.88, −0.73, −0.61, and the like. The value of $f_3/F$ may be 1.20, 1.272, 1.298, 1.395, 1.401, 1.591, 1.611, 1.635, 1.70, and the like. The value of $f_4/F$ may be 1.07, 1.172, 1.198, 1.295, 1.301, 1.391, 1.41, 1.435, 1.48, and the like. The value of $f_5/F$ may be −3.70, −3.693, −2.59, −2.35, −1.82, −1.58, −1.41, −1.38, −1.23, −1.19, and the like. The value of $f_6/F$ may be −15.65, −14.872, −10.898, −0.995, 1.001, 7.091, 11.151, 31.235, 47.42, 52.00, and the like.

In the above relational expressions (1), (2), (3), (4), (5), and (6), value ranges for $f_1/F$, $f_2/F$, $f_3/F$, $f_4/F$, $f_5/F$, and $f_6/F$ are closely related to the correction of system aberrations, the difficulty of processing optical elements, and the sensitivity to assembly deviations of optical elements. The value of $f_1/F$ in the relational expression (1) is greater than or equal to 0.86, which improves the processability of optical elements in the eyepiece optical system. Its value is less than or equal to 1.42, which allows for sufficient correction of system aberrations, thereby achieving better quality optical effects. The value of $f_2/F$ in the relational expression (2) is greater than or equal to −1.57, which allows for sufficient correction of system aberrations, thereby achieving desirable optical effects. Its value is less than −0.61, which improves the processability of optical elements in the eyepiece optical system. The value of $f_3/F$ in the relational expression (3) is greater than or equal to 1.20, which improves the processability of optical elements in the eyepiece optical system. Its value is less than or equal to 1.70, which allows for sufficient correction of system aberrations, thereby achieving better quality optical effects. The value of $f_4/F$ in the relational expression (4) is greater than or equal to 1.07, which improves the processability of optical elements in the eyepiece optical system. Its value is less than or equal to 1.48, which allows for sufficient correction of system aberrations, thereby achieving better quality optical effects. The value of $f_5/F$ in the relational expression (5) is greater than or equal to −3.70, which allows for sufficient correction of system aberrations, thereby achieving desirable optical effects. Its value is less than −1.19, which improves the processability of optical elements in the eyepiece optical system. The value of $f_6/F$ in the relational expression (6) is greater than or equal to −15.65, ensuring that the system has a sufficiently large back focal length, which is beneficial for the eyepiece optical system to achieve a wide range of visibility adjustment. Its value is less than or equal to 52.00, which allows the system aberration to be sufficiently corrected, thereby achieving desirable quality optical effects, and improving the processability of optical elements in the eyepiece optical system.

Material properties of the various lenses in the eyepiece optical system meet the following relational expressions (7) and (8):

$$1.53 \leq Nd \leq 1.89; \quad (7)$$

$$20.40 \leq Vd \leq 63.96; \quad (8)$$

wherein Nd is a refractive index of each lens in the eyepiece optical system on a d-line, and Vd is an Abbe number of each lens in the eyepiece optical system on the d-line.

In the above embodiment, the value of Nd may be 1.53, 1.682, 1.698, 1.75, 1.781, 1.791, 1.851, 1.87, 1.89, and the like, and the value of Vd may be 20.4, 22.682, 33.698, 34.75, 43.781, 55.791, 61.851, 62.87, 63.96, and the like.

In the above embodiment, a combination of six lenses is used to form the eyepiece optical system, and the aberrations of the system are sufficiently corrected by the combinations of positive and negative lenses, thereby improving the optical resolution of the system. The first lens, the third lens, and the fifth lens provide sufficient positive focal power to ensure that the eyepiece optical system can achieve a sufficiently large field-of-view angle. Moreover, lenses with low refractive indexes are used for combination, which effectively alleviates the defects of the prior art, thereby achieving a large field-of-view angle, low distortion, and high optical resolution, reducing the manufacturing difficulty, manufacturing cost, and product weight of the optical system, and greatly improving the user experience of the product. By combining dispersion coefficients of the materials, the chromatic aberration of the optical system is alleviated, thereby enhancing the optical performance of the system.

In a further embodiment, the effective focal length of the first lens is $f_1$, the effective focal length of the third lens is $f_3$, the effective focal length of the fourth lens is $f_4$, and $f_1$, $f_3$, and $f_4$ meet the following relational expressions (9) and (10):

$$0.96 \le f_3/f_1 \le 1.78; \quad (9)$$

$$0.88 \le f_4/f_1 \le 1.35. \quad (10)$$

The value of $f_3/f_1$ may be 0.96, 0.982, 0.998, 1.05, 1.101, 1.391, 1.451, 1.535, 1.78, and the like. The value of $f_4/f_1$ may be 0.88, 0.982, 0.998, 1.05, 1.101, 1.191, 1.251, 1.335, 1.35, and the like.

A lower limit value of $f_3/f_1$ in the relational expression (9) is greater than 0.96, which is used for reducing the difficulty in processing and manufacturing the third lens and the requirement for a high refractive index of the material. Its value range is less than 1.78, which is beneficial for the system to achieve an image telecentric optical path. A lower limit value of $f_4/f_1$ in the relational expression (10) is greater than 0.88, which is used for reducing the difficulty in processing and manufacturing the fourth lens and the requirement for a high refractive index of the material. Its value range is less than 1.35, which is beneficial for the system to achieve an image telecentric optical path.

In a further embodiment, the effective focal length of the second lens is $f_2$, the effective focal length of the fifth lens is $f_5$, and $f_2$ and $f_5$ meet the following relational expression (11):

$$0.76 \le f_5/f_2 \le 6.10. \quad (11)$$

The value of $f_5/f_2$ may be 0.76, 0.782, 1.998, 2.05, 3.101, 4.391, 5.451, 5.535, 6.1, and the like.

A lower limit value of $f_5/f_2$ in the relational expression (11) is greater than 0.76, which is used for reducing the difficulty in processing and manufacturing the fifth lens and the requirement for a high refractive index of the material. Its value range is less than 6.10, which is beneficial for the system to achieve an image telecentric optical path. In a further embodiment, the first lens is a biconvex lens.

In a further embodiment, the second lens, the third lens, the fifth lens, and the sixth lens are all biconcave lenses, the optical surfaces of the second lens and the third lens are all convex towards the micro-image display side, and the optical surfaces of the fifth lens and the sixth lens are all convex towards the human eye side.

In a further embodiment, an optical surface of the fourth lens close to the human eye side is convex towards the human eye side.

In the above embodiment, by arranging the various lenses in various concave and convex directions, aberrations such as astigmatism and field curvature of the system are further alleviated, which is beneficial for the eyepiece optical system to achieve high-resolution optical effects with full-frame uniform image quality.

In a further embodiment, a curvature radius of the optical surface of the sixth lens close to the human eye side is $R_{61}$, and a curvature radius of the optical surface of the sixth lens away from the human eye side is $R_{62}$, and $R_{61}$ and $R_{62}$ meet the following relational expression (12):

$$0.99 \le R_{61}/R_{62} \le 1.49. \quad (12)$$

The value of $R_{61}/R_{62}$ may be 0.99, 1.082, 1.098, 1.15, 1.151, 1.191, 1.251, 1.35, 1.49, and the like.

In the above embodiment, a lower limit condition for the value of $R_{61}/R_{62}$ is greater than or equal to 0.99, which allows the seventh lens to provide sufficient positive focal power, thereby ensuring that the eyepiece optical system can achieve a sufficiently large field-of-view angle. An upper limit condition for its value is less than or equal to 1.49, thereby reducing the difficulty in correcting the spherical aberration and facilitating the realization of a large optical aperture.

In a further embodiment, the effective focal length of the sixth lens is $f_6$, and $f_6$ meets the following relational expression (13):

$$46.61 \le |f_6|. \quad (13)$$

The value of $|f_6|$ may be 46.61, 51.082, 66.098, 87.15, 100.151, 211.191, 321.251, 722.35, 900.49, and the like.

The optical performance and difficulty in processing and manufacturing of the optical system can be well balanced.

In a further embodiment, the first lens, the second lens, the third lens, the fourth lens, the fifth lens, and the sixth lens are made of a plastic resin material or a glass material.

Therefore, aberrations at all levels of the eyepiece optical system can be sufficiently corrected, and the manufacturing cost of optical elements and the weight of the optical system are also controlled.

In a further embodiment, the optical surfaces of the first lens, the second lens, the third lens, the fourth lens, the fifth lens, and the sixth lens are all even-order aspherical surfaces, and the even-order aspherical surfaces meet the following relational expression (14):

$$z = \frac{cr^2}{1+\sqrt{1-(1+k)c^2r^2}} + \alpha_2 r^2 + \alpha_4 r^4 + \alpha_6 r^6 + \cdots; \quad (14)$$

wherein z is a vector height of the optical surface, c is a curvature at an aspherical vertex, k is an aspherical coefficient, $\alpha_2$, $\alpha_4$, $\alpha_6$, . . . are coefficients of various orders, and r is a distance coordinate from a point on a curved surface to an optical axis of the lens system.

The aberrations (including spherical aberration, coma, distortion, field curvature, astigmatism, chromatic aberration, and other higher-order aberrations) of the optical system are sufficiently corrected, which is beneficial for the eyepiece optical system to achieve a large field-of-view angle and large aperture while further improving the image quality of a central field of view and an edge field of view, reducing the difference in the image quality between the central field of view and the edge field of view, and achieving more uniform image quality and low distortion throughout the entire frame.

The principles, solutions, and display results of the above eyepiece optical system will be further elaborated through more specific embodiments.

In the following embodiments, a diaphragm E may be an exit pupil of the eyepiece optical system for imaging, which is a virtual exit aperture. When the pupil of the human eye is at the diaphragm position, the best imaging effect can be observed. A micro-image display I is an image plane of the eyepiece optical system.

Embodiment 1

TABLE 1

| Surface | Curvature radius | Thickness | Glass Refractive index | Abbe number | Net Diameter | Cone Coefficient |
|---|---|---|---|---|---|---|
| Human eye | Infinite | 12.5 | | | 4 | |
| 1 | 33.06545 | 6.632873 | 1.729164 | 54.669031 | 16.46021 | −23.64223 |
| 2 | −28.27888 | 1.053178 | | | 19.01934 | 2.346406 |
| 3 | −9.195501 | 2.001998 | 1.639727 | 23.530454 | 18.94596 | −1.502489 |
| 4 | −24.29432 | 0.1084755 | | | 19.83897 | −29.96748 |
| 5 | −45.76347 | 3.757742 | 1.740999 | 52.676196 | 19.86027 | −5.644118 |
| 6 | −14.11227 | 0.09999886 | | | 20.45739 | −0.8523651 |
| 7 | 15.25145 | 6.408605 | 1.816001 | 46.56921 | 20.46831 | 0.2317208 |
| 8 | 330.2366 | 0.9932179 | | | 19.79056 | −67.15394 |
| 9 | −86.7479 | 1.999999 | 1.66059 | 20.401227 | 19.67619 | −868.2302 |
| 10 | 14.4985 | 0.3477096 | | | 17.21216 | −1.82642 |
| 11 | 14.92282 | 2.142428 | 1.802793 | 46.774142 | 17.24563 | −2.258119 |
| 12 | 9.994115 | 4.037318 | | | 16.48523 | −0.384136 |
| Image plane | Infinite | | | | 13.0003 | |

FIG. 1 is a schematic structural diagram of an optical path of an eyepiece optical system according to Embodiment 1. As shown in the figure, from an observation side of human eyes to a micro-image display I side (from left to right), there are a diaphragm E, a first lens L1, a second lens L2, a third lens L3, a fourth lens L4, a fifth lens L5, and a sixth lens L6. The first lens L1, the third lens L3, and the fourth lens L4 are positive lenses, and the second lens L2 and the fifth lens L5 are negative lenses. The first lens L1 is a biconvex lens. The second lens L2, the third lens L3, the fifth lens L5, and the sixth lens L6 are all biconcave lenses. Optical surfaces of the second lens L2 and the third lens L3 are all convex towards the micro-image display I side, and optical surfaces of the fifth lens L5 and the sixth lens L6 are all convex towards the human eye side. The effective focal length $f_1$ of the first lens group L1 is 21.84, the effective focal length $f_2$ of the second lens group L2 is −24.24, the effective focal length $f_3$ of the third lens group L3 is 26.13, the effective focal length $f_4$ of the fourth lens group L4 is 19.35, the effective focal length $f_5$ of the fifth lens L5 is −18.52, and the effective focal length $f_6$ of the sixth lens L6 is −46.61, and the effective focal length F of the eyepiece optical system is 15.45. Here, the optical surface close to the diaphragm E side is numbered 1, and so on (from left to right), and the optical surface close to the micro-image display I is numbered 12.

Figure 2:
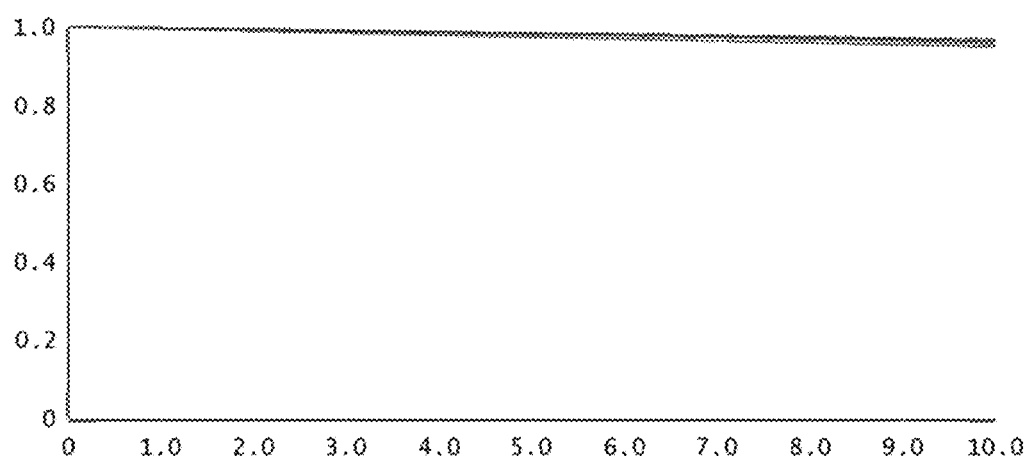
FIG. 2 is a schematic diagram of a modulation transfer function (MTF) of the eyepiece optical system according to Embodiment 1 of the present invention.
Figure 3:
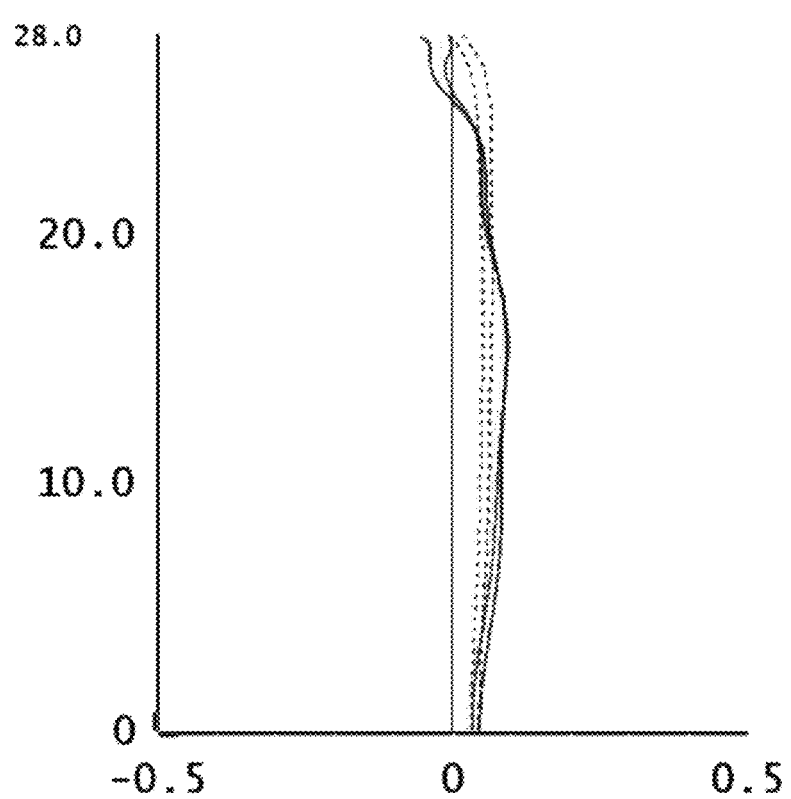
FIG. 3 is a schematic diagram of field curvature of the eyepiece optical system according to Embodiment 1 of the present invention.
Figure 4:
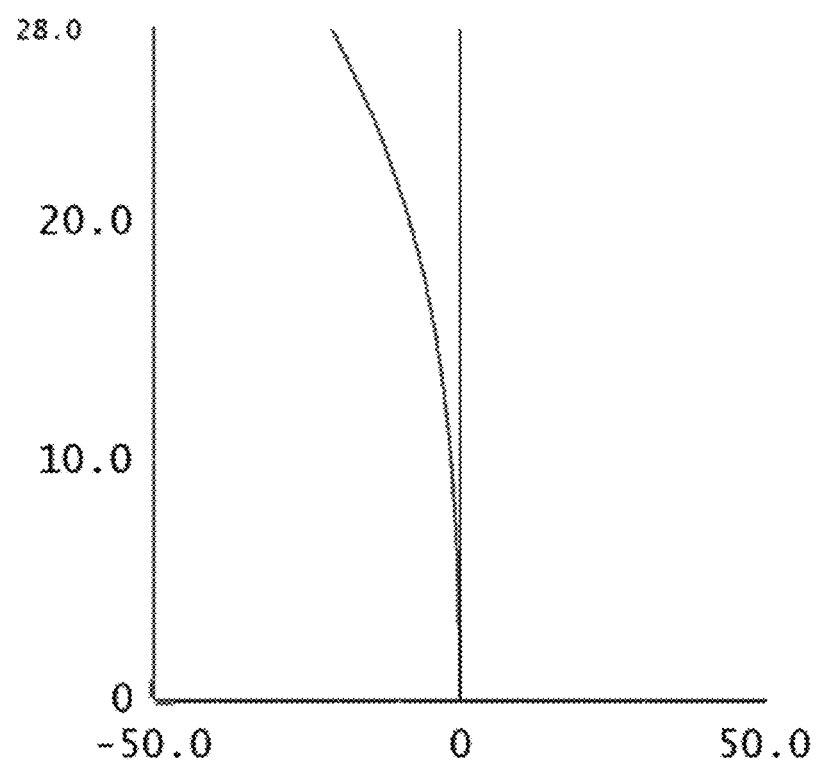
FIG. 4 is a schematic diagram of distortion of the eyepiece optical system according to Embodiment 1 of the present invention.

FIG. 2, FIG. 3, and FIG. 4 respectively show diagrams of the optical transfer function (MTF) curve, field curvature, and distortion of the eyepiece optical system according to Embodiment 1 of the present invention, which reflect that, while ensuring a large field of view, the schematic diagram of the transfer function MTF has a resolution value greater than 0.9 at 10 lp. As can be concluded from the above data, the optical system has a high imaging quality with minimal field curvature and optical distortion.

Embodiment 2

TABLE 2

| Surface | Curvature radius | Thickness | Glass Refractive index | Abbe number | Net Diameter | Cone Coefficient |
|---|---|---|---|---|---|---|
| Human eye | Infinite | 13.1 | | | 5 | |
| 1 | 32.4305 | 6.533362 | 1.774002 | 49.604291 | 20.21194 | −7.231918 |
| 2 | −17.36203 | 3.247612 | | | 21.10725 | −1.701368 |
| 3 | −5.269202 | 2.197733 | 1.761822 | 26.555686 | 21.08558 | −1.542666 |
| 4 | −16.77116 | 0.3460343 | | | 23.95556 | −13.32712 |
| 5 | −59.18699 | 4.981971 | 1.740999 | 52.676196 | 24.52115 | 6.513956 |
| 6 | −15.00258 | 0.1000001 | | | 25.51134 | −1.563014 |
| 7 | 17.76288 | 6.939857 | 1.802793 | 46.774142 | 24.61669 | 0.4344087 |
| 8 | −97.6503 | 0.4864206 | | | 23.39371 | 19.6337 |
| 9 | 40.38309 | 1.999998 | 1.6355 | 23.784616 | 23.23208 | 3.7448 |
| 10 | 11.8288 | 0.8972701 | | | 20.90759 | −2.896659 |
| 11 | 13.50463 | 2.726281 | 1.589128 | 61.247611 | 20.92325 | −1.423038 |
| 12 | 12.86075 | 4.563863 | | | 19.97458 | 0.2340736 |
| Image plane | Infinite | | | | 17.99999 | |

Figure 5:
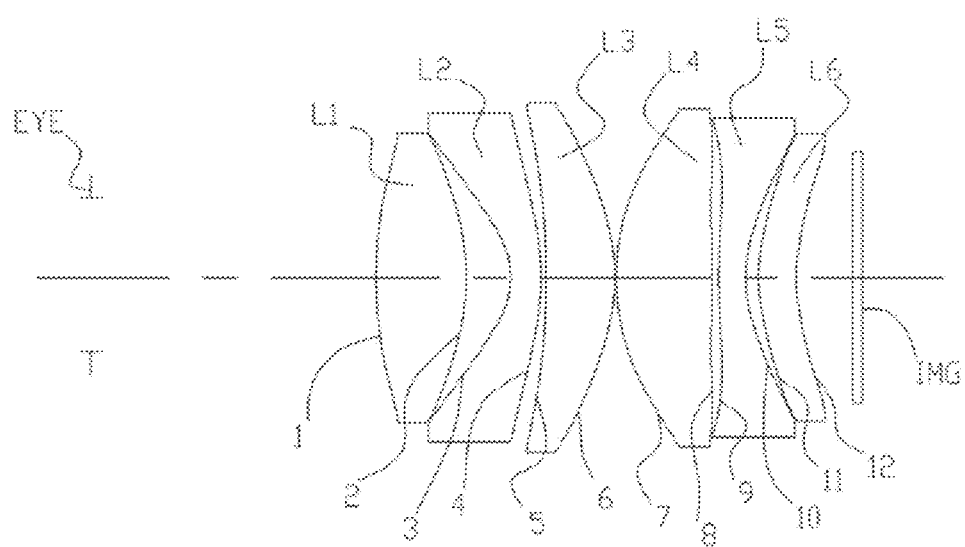
FIG. 5 is a schematic structural diagram of an eyepiece optical system according to Embodiment 2 of the present invention.

FIG. 5 is a schematic structural diagram of an optical path of an eyepiece optical system according to Embodiment 2. As shown in the figure, from an observation side of human eyes to a micro-image display I side (from left to right), there are a diaphragm E, a first lens L1, a second lens L2, a third lens L3, a fourth lens L4, a fifth lens L5, and a sixth lens L6. The first lens L1, the third lens L3, and the fourth lens L4 are positive lenses, and the second lens L2 and the fifth lens L5 are negative lenses. The first lens L1 is a biconvex lens. The second lens L2, the third lens L3, the fifth lens L5, and the sixth lens L6 are all biconcave lenses. Optical surfaces of the second lens L2 and the third lens L3 are all convex towards the micro-image display I side, and optical surfaces of the fifth lens L5 and the sixth lens L6 are all convex towards the human eye side. The effective focal length $f_1$ of the first lens group L1 is 15.45, the effective focal length $f_2$ of the second lens group L2 is −10.93, the effective focal length $f_3$ of the third lens group L3 is 25.80, the effective focal length $f_4$ of the fourth lens group L4 is 19.17, the effective focal length $f_5$ of the fifth lens L5 is −26.89, the effective focal length $f_6$ of the sixth lens L6 is 798.23, and the effective focal length F of the eyepiece optical system is 17.80. Here, the optical surface close to the diaphragm E side is numbered 1, and so on (from left to right), and the optical surface close to the micro-image display I is numbered 12.

Figure 6:
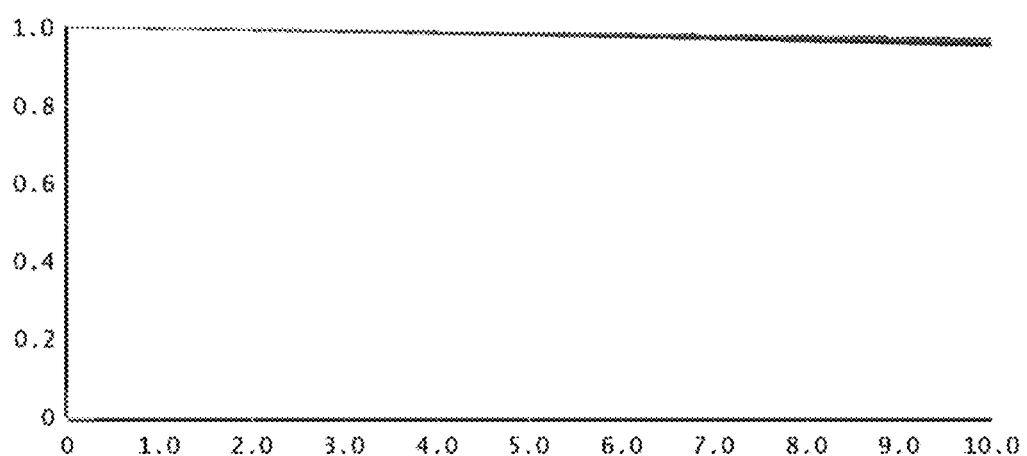
FIG. 6 is a schematic diagram of a modulation transfer function (MTF) of the eyepiece optical system according to Embodiment 2 of the present invention.
Figure 7:
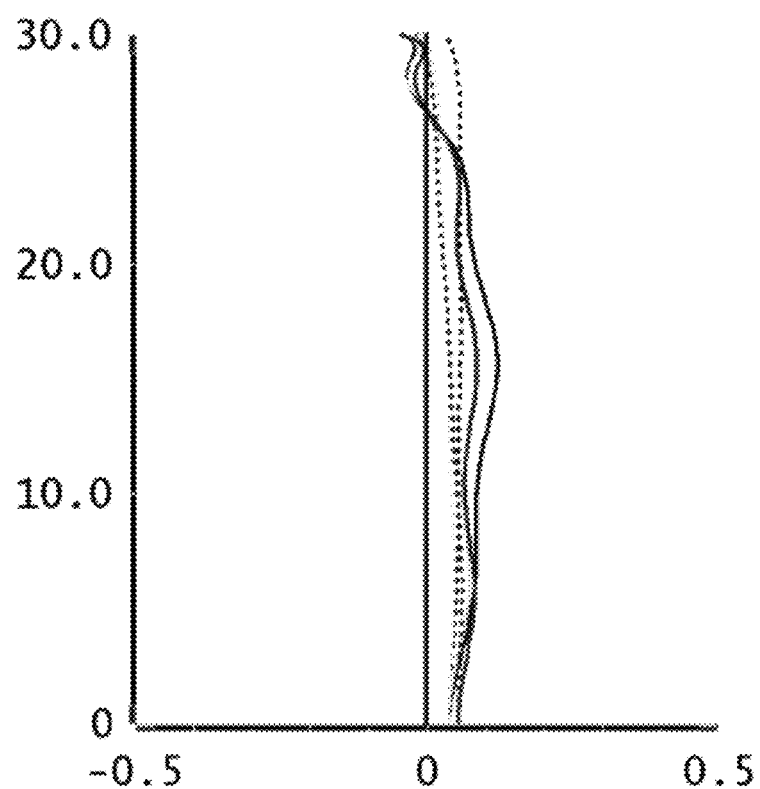
FIG. 7 is a schematic diagram of field curvature of the eyepiece optical system according to Embodiment 2 of the present invention.
Figure 8:
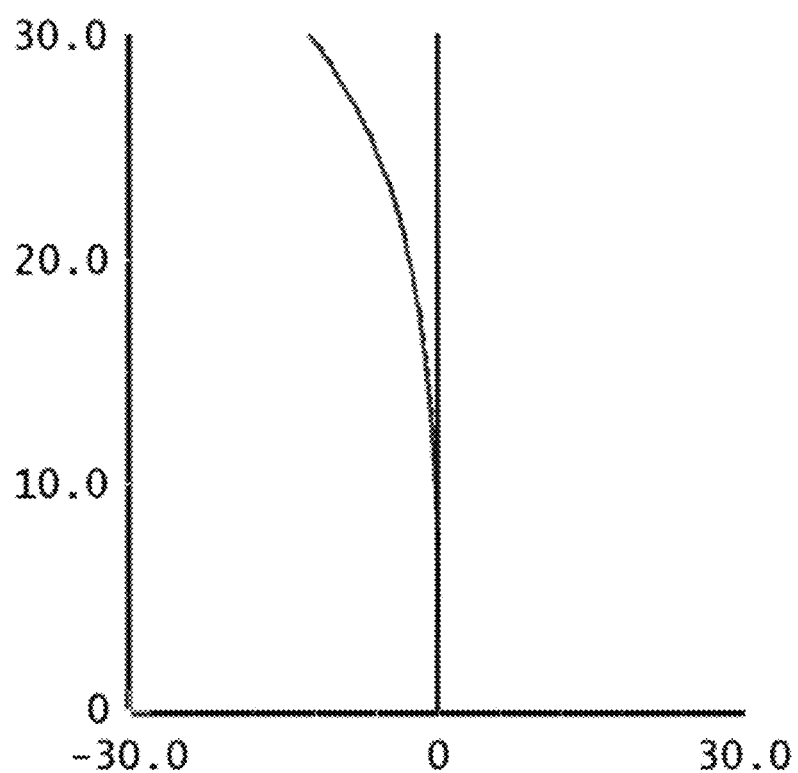
FIG. 8 is a schematic diagram of distortion of the eyepiece optical system according to Embodiment 2 of the present invention.

FIG. 6, FIG. 7, and FIG. 8 respectively show diagrams of the optical transfer function (MTF) curve, field curvature, and distortion of the eyepiece optical system according to Embodiment 2 of the present invention, which reflect that, while ensuring a large field of view, the schematic diagram of the transfer function MTF has a resolution value greater than 0.9 at 10 lp. As can be concluded from the above data, the optical system has a high imaging quality with minimal field curvature and optical distortion.

Embodiment 3

TABLE 3

| Surface | Curvature radius | Thickness | Glass | | Net Diameter | Cone Coefficient |
| | | | Refractive index | Abbe number | | |
| --- | --- | --- | --- | --- | --- | --- |
| Human eye | Infinite | 13.1 | | | 5 | |
| 1 | 26.87253 | 6.460155 | 1.774002 | 49.604291 | 20.68696 | −5.588363 |
| 2 | −22.85204 | 3.129491 | | | 21.46352 | −1.630976 |
| 3 | −6.22714 | 2.264785 | 1.761822 | 26.555686 | 21.41838 | −1.475402 |
| 4 | −20.218 | 0.9231806 | | | 23.98092 | −18.12652 |
| 5 | −57.02859 | 5.156383 | 1.740999 | 52.676196 | 24.52959 | 5.858847 |
| 6 | −13.29786 | 0.09999844 | | | 25.41778 | −1.556961 |
| 7 | 18.22608 | 6.305331 | 1.774002 | 49.604291 | 24.08435 | 0.4642134 |
| 8 | −428.7882 | 0.5136817 | | | 23.42322 | −283.9893 |
| 9 | 46.02049 | 1.999998 | 1.6355 | 23.784616 | 23.30405 | 4.960968 |
| 10 | 10.85231 | 0.4075988 | | | 20.89956 | −3.602109 |
| 11 | 12.90032 | 2.578722 | 1.568883 | 62.960665 | 20.93522 | −1.508776 |
| 12 | 12.25513 | 5.031843 | | | 20.35359 | 0.2016295 |
| Image plane | Infinite | | | | 18.92158 | |

Figure 9:
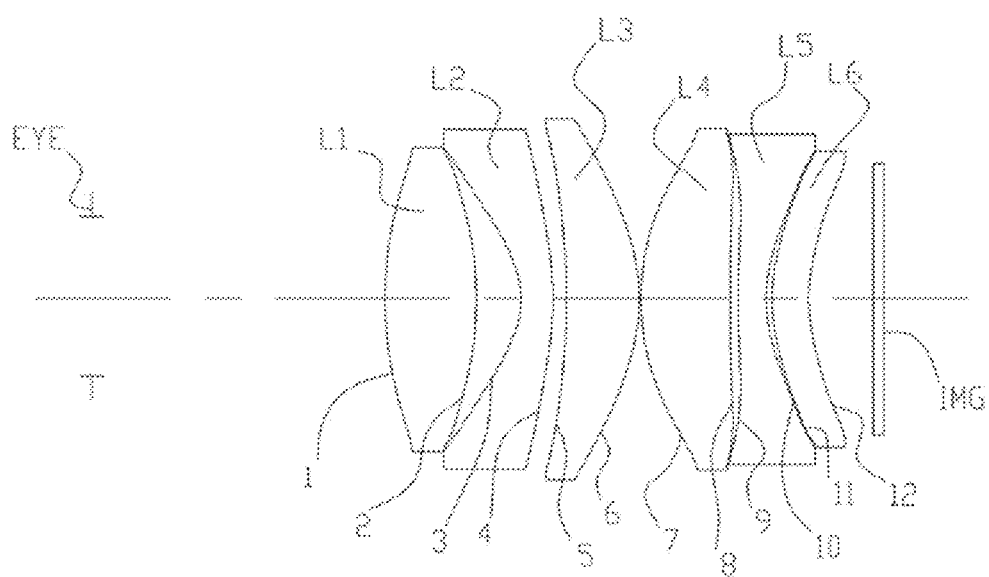
FIG. 9 is a schematic structural diagram of an eyepiece optical system according to Embodiment 3 of the present invention.

FIG. 9 is a schematic structural diagram of an optical path of an eyepiece optical system according to Embodiment 3. As shown in the figure, from an observation side of human eyes to a micro-image display I side (from left to right), there are a diaphragm E, a first lens L1, a second lens L2, a third lens L3, a fourth lens L4, a fifth lens L5, and a sixth lens L6. The first lens L1, the third lens L3, and the fourth lens L4 are positive lenses, and the second lens L2 and the fifth lens L5 are negative lenses. The first lens L1 is a biconvex lens. The second lens L2, the third lens L3, the fifth lens L5, and the sixth lens L6 are all biconcave lenses. Optical surfaces of the second lens L2 and the third lens L3 are all convex towards the micro-image display I side, and optical surfaces of the fifth lens L5 and the sixth lens L6 are all convex towards the human eye side. The effective focal length $f_1$ of the first lens group L1 is 26.86, the effective focal length $f_2$ of the second lens group L2 is −12.63, the effective focal length $f_3$ of the third lens group L3 is 22.22, the effective focal length $f_4$ of the fourth lens group L4 is 22.66, the effective focal length $f_5$ of the fifth lens L5 is −22.71, the effective focal length $f_6$ of the sixth lens L6 is 951.66, and the effective focal length F of the eyepiece optical system is 18.30. Here, the optical surface close to the diaphragm E side is numbered 1, and so on (from left to right), and the optical surface close to the micro-image display I is numbered 12.

Figure 10:
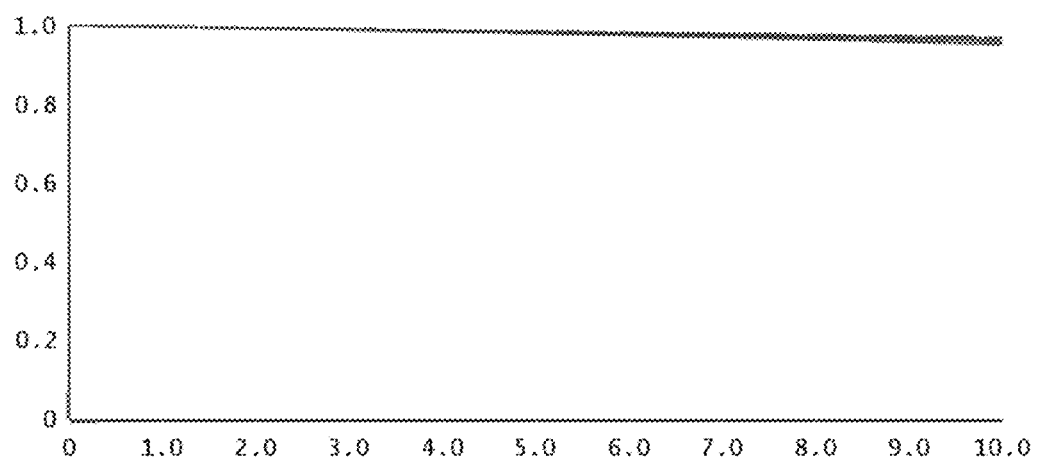
FIG. 10 is a schematic diagram of a modulation transfer function (MTF) of the eyepiece optical system according to Embodiment 3 of the present invention.
Figure 11:
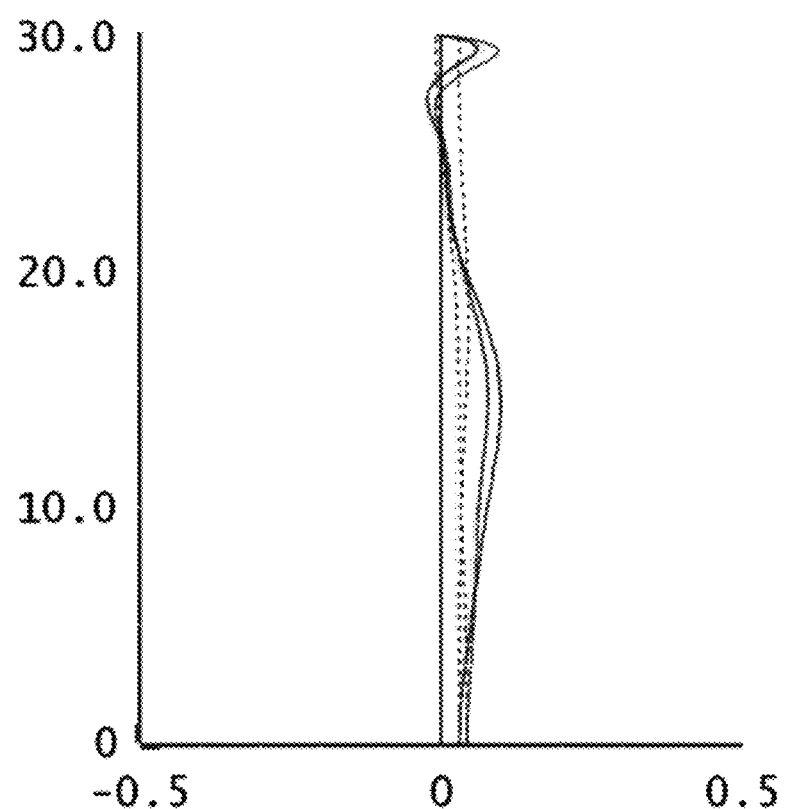
FIG. 11 is a schematic diagram of field curvature of the eyepiece optical system according to Embodiment 3 of the present invention.
Figure 12:
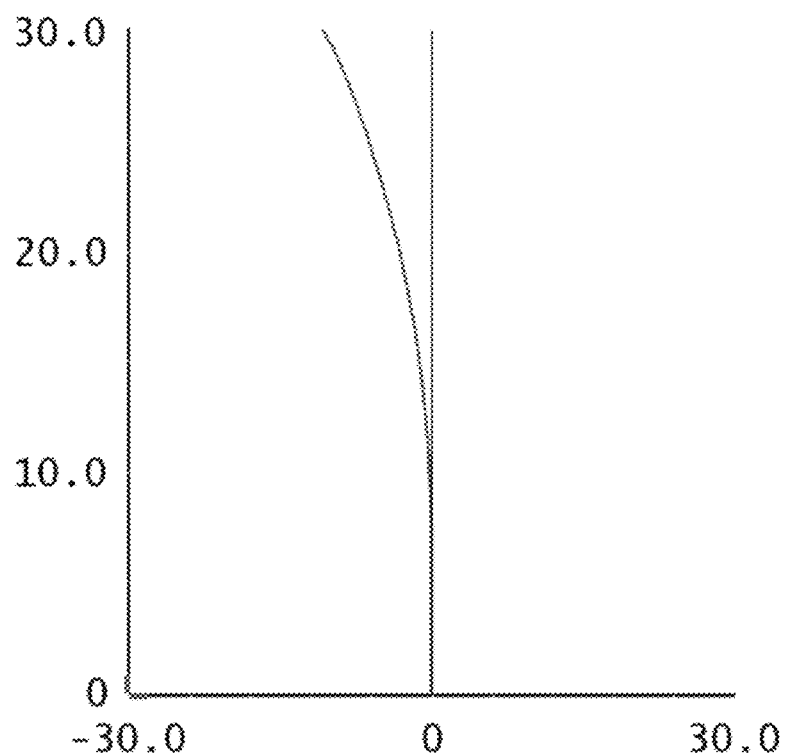
FIG. 12 is a schematic diagram of distortion of the eyepiece optical system according to Embodiment 3 of the present invention.

FIG. 10, FIG. 11, and FIG. 12 respectively show diagrams of the optical transfer function (MTF) curve, field curvature, and distortion of the eyepiece optical system according to Embodiment 3 of the present invention, which reflect that, while ensuring a large field of view, the schematic diagram of the transfer function MTF has a resolution value greater than 0.9 at 10 lp. As can be concluded from the above data, the optical system has a high imaging quality with minimal field curvature and optical distortion.

Embodiment 4

TABLE 4

| Surface | Curvature radius | Thickness | Glass | | Net Diameter | Cone Coefficient |
| | | | Refractive index | Abbe number | | |
| --- | --- | --- | --- | --- | --- | --- |
| Human eye | Infinite | 13.1 | | | 5 | |
| 1 | 30.68126 | 5.935817 | 1.787998 | 47.516598 | 18.02767 | −9.534987 |
| 2 | −28.98167 | 2.113071 | | | 19.94566 | 0.6623671 |
| 3 | −6.790489 | 1.999997 | 1.632785 | 23.308235 | 19.85317 | −1.578825 |
| 4 | −23.50787 | 0.1000008 | | | 21.32321 | −38.33472 |
| 5 | −49.89426 | 4.129826 | 1.883004 | 40.806875 | 21.34933 | 0.22223 |
| 6 | −13.11922 | 0.09998696 | | | 22.01446 | −1.444129 |
| 7 | 16.51443 | 6.476413 | 1.802793 | 46.774142 | 21.68283 | 0.3683406 |
| 8 | 112.2519 | 0.514182 | | | 20.87951 | −1559.711 |
| 9 | 53.70569 | 2.000009 | 1.66059 | 20.401227 | 20.59163 | −2.2797 |
| 10 | 10.55577 | 0.6134579 | | | 17.84792 | −2.387286 |
| 11 | 14.01979 | 2.415996 | 1.534984 | 55.795531 | 17.80282 | −1.179926 |
| 12 | 11.92243 | 4.218798 | | | 16.4 | 0.08420257 |
| Image plane | Infinite | | | | 13.99879 | |

Figure 13:
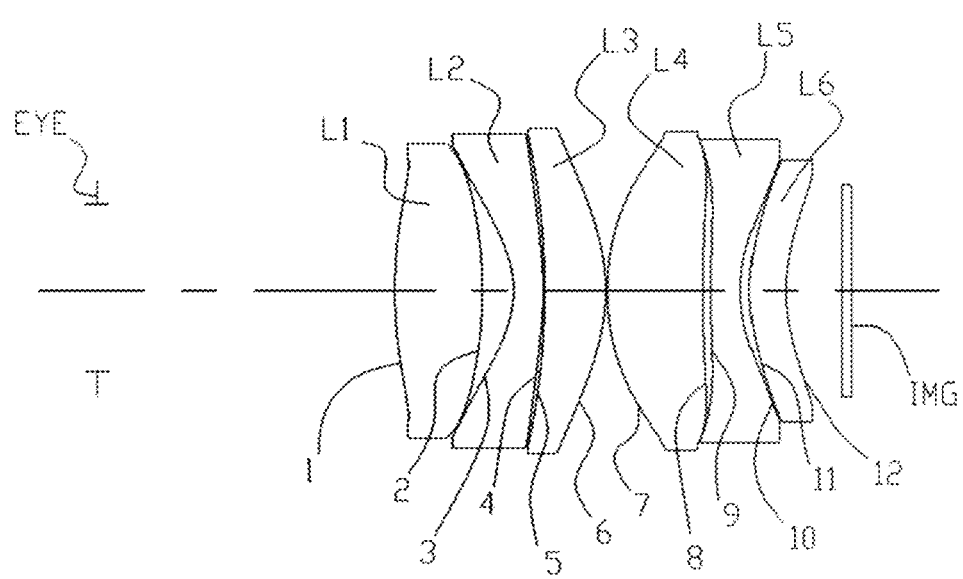
FIG. 13 is a schematic structural diagram of an eyepiece optical system according to Embodiment 4 of the present invention.

FIG. 13 is a schematic structural diagram of an optical path of an eyepiece optical system according to Embodiment 4. As shown in the figure, from an observation side of human eyes to a micro-image display I side (from left to right), there are a diaphragm E, a first lens L1, a second lens L2, a third lens L3, a fourth lens L4, a fifth lens L5, and a sixth lens L6. The first lens L1, the third lens L3, and the fourth lens L4 are positive lenses, and the second lens L2 and the fifth lens L5 are negative lenses. The first lens L1 is a biconvex lens. The second lens L2, the third lens L3, the fifth lens L5, and the sixth lens L6 are all biconcave lenses. Optical surfaces of the second lens L2 and the third lens L3 are all convex towards the micro-image display I side, and optical surfaces of the fifth lens L5 and the sixth lens L6 are all convex towards the human eye side. The effective focal length $f_1$ of the first lens group L1 is 19.72, the effective focal length $f_2$ of the second lens group L2 is −15.72, the effective focal length $f_3$ of the third lens group L3 is 19.076, the effective focal length $f_4$ of the fourth lens group L4 is 23.34, the effective focal length $f_5$ of the fifth lens L5 is −20.12, the effective focal length $f_6$ of the sixth lens L6 is −248.5, and the effective focal length F of the eyepiece optical system is 15.87. Here, the optical surface close to the diaphragm E side is numbered 1, and so on (from left to right), and the optical surface close to the micro-image display I is numbered 12.

Figure 14:
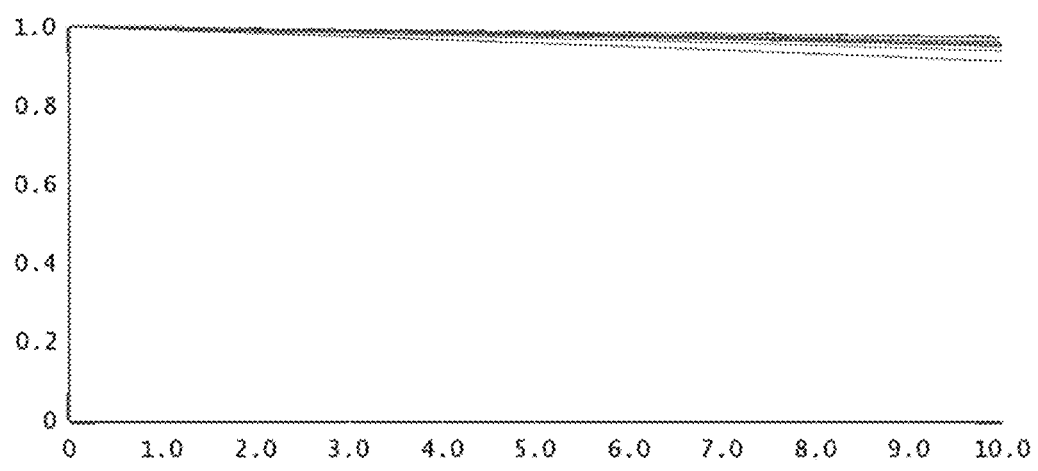
FIG. 14 is a schematic diagram of a modulation transfer function (MTF) of the eyepiece optical system according to Embodiment 4 of the present invention.
Figure 15:
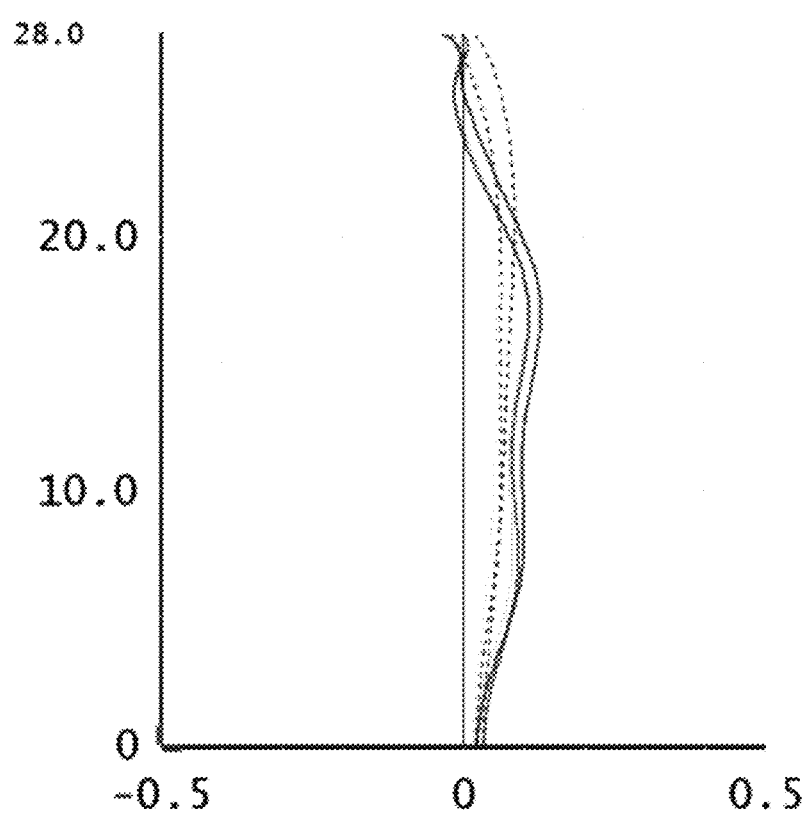
FIG. 15 is a schematic diagram of field curvature of the eyepiece optical system according to Embodiment 4 of the present invention.
Figure 16:
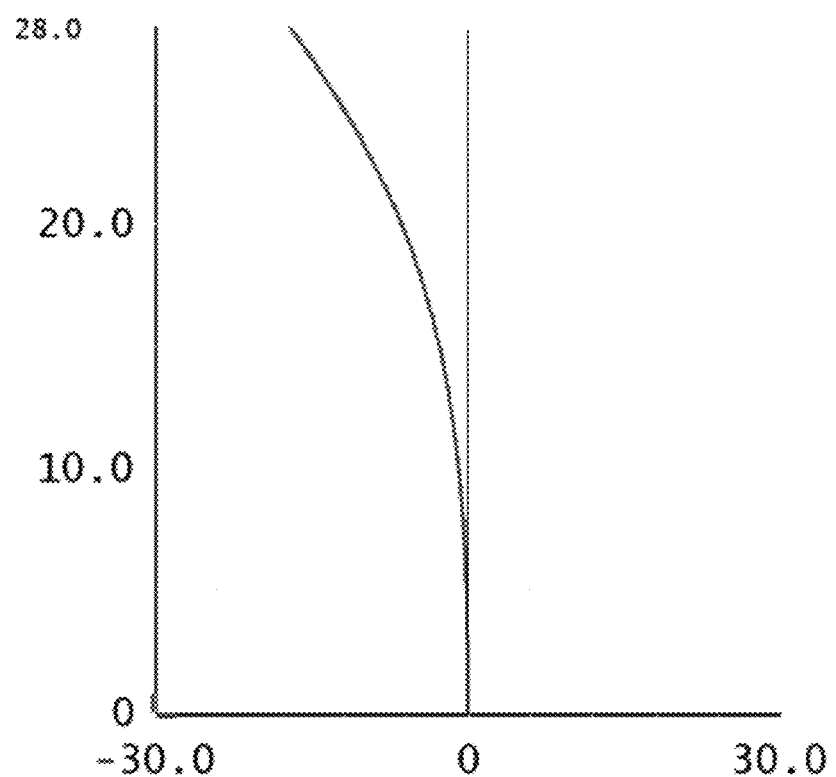
FIG. 16 is a schematic diagram of distortion of the eyepiece optical system according to Embodiment 4 of the present invention.

FIG. 14, FIG. 15, and FIG. 16 respectively show diagrams of the optical transfer function (MTF) curve, field curvature, and distortion of the eyepiece optical system according to Embodiment 4 of the present invention, which reflect that, while ensuring a large field of view, the schematic diagram of the transfer function MTF has a resolution value greater than 0.9 at 10 lp. As can be concluded from the above data, the optical system has a high imaging quality with minimal field curvature and optical distortion.

Embodiment 5

TABLE 5

| Surface | Curvature radius | Thickness | Glass | | Net Diameter | Cone Coefficient |
| | | | Refractive index | Abbe number | | |
| --- | --- | --- | --- | --- | --- | --- |
| Human eye | Infinite | 13.1 | | | 4 | |
| 1 | 34.59 | 7.054619 | 1.743306 | 49.335808 | 22.90289 | −9.885652 |
| 2 | −18.29531 | 4.630236 | | | 23.62678 | −1.716466 |
| 3 | −4.616121 | 2.774167 | 1.6355 | 23.784616 | 23.60361 | −1.540226 |
| 4 | −16.25889 | 0.09994897 | | | 27.45627 | −13.74345 |
| 5 | −69.67647 | 5.616324 | 1.6779 | 54.896588 | 28.00915 | 5.999989 |
| 6 | −16.56895 | 0.09991853 | | | 28.89426 | −1.486587 |
| 7 | 18.04335 | 7.868655 | 1.743306 | 49.335808 | 27.57256 | 0.388889 |
| 8 | −62.99835 | 0.318712 | | | 26.28616 | 14.29674 |
| 9 | 39.88752 | 2.149302 | 1.6355 | 23.784616 | 26.15085 | 5.449177 |
| 10 | 20.19475 | 0.09999348 | | | 23.8844 | −10.36531 |
| 11 | 14.84772 | 2.805663 | 1.534984 | 55.795531 | 23.87848 | −1.998219 |
| 12 | 15.05697 | 4.872395 | | | 22.61307 | 0.3190421 |
| Image plane | Infinite | | | | 20.00185 | |

Figure 17:
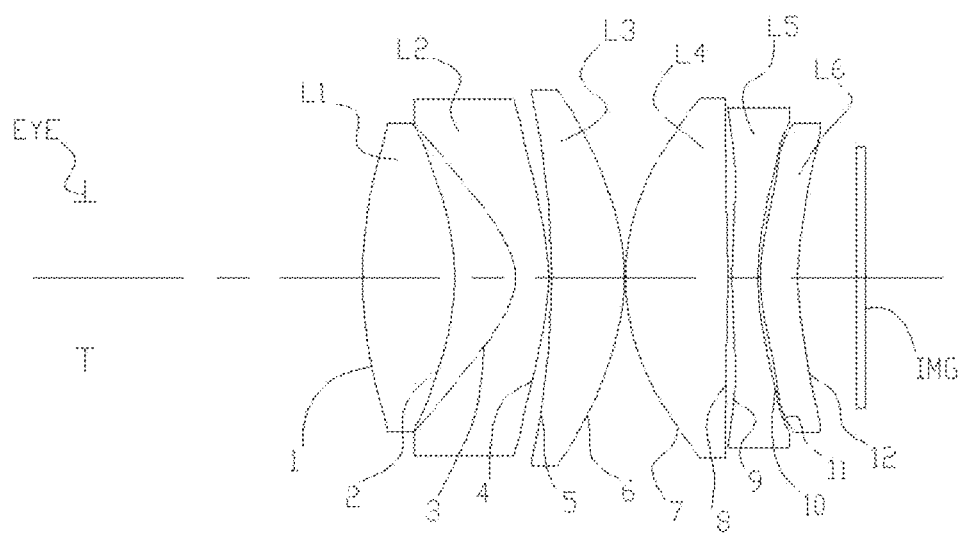
FIG. 17 is a schematic structural diagram of an eyepiece optical system according to Embodiment 5 of the present invention.

FIG. 17 is a schematic structural diagram of an optical path of an eyepiece optical system according to Embodiment 1. As shown in the figure, from an observation side of human eyes to a micro-image display I side (from left to right), there are a diaphragm E, a first lens L1, a second lens L2, a third lens L3, a fourth lens L4, a fifth lens L5, and a sixth lens L6. The first lens L1, the third lens L3, and the fourth lens L4 are positive lenses, and the second lens L2 and the fifth lens L5 are negative lenses. The first lens L1 is a biconvex lens. The second lens L2, the third lens L3, the fifth lens L5, and the sixth lens L6 are all biconcave lenses. Optical surfaces of the second lens L2 and the third lens L3 are all convex towards the micro-image display I side, and optical surfaces of the fifth lens L5 and the sixth lens L6 are all convex towards the human eye side. The effective focal length $f_1$ of the first lens group L1 is 17.19, the effective focal length $f_2$ of the second lens group L2 is −11.11, the effective focal length $f_3$ of the third lens group L3 is 30.66, the effective focal length $f_4$ of the fourth lens group L4 is 19.63, the effective focal length $f_5$ of the fifth lens L5 is −66.81, the effective focal length $f_6$ of the sixth lens L6 is 350.55, and the effective focal length F of the eyepiece optical system is 18.04. Here, the optical surface close to the diaphragm E side is numbered 1, and so on (from left to right), and the optical surface close to the micro-image display I is numbered 12.

Figure 18:
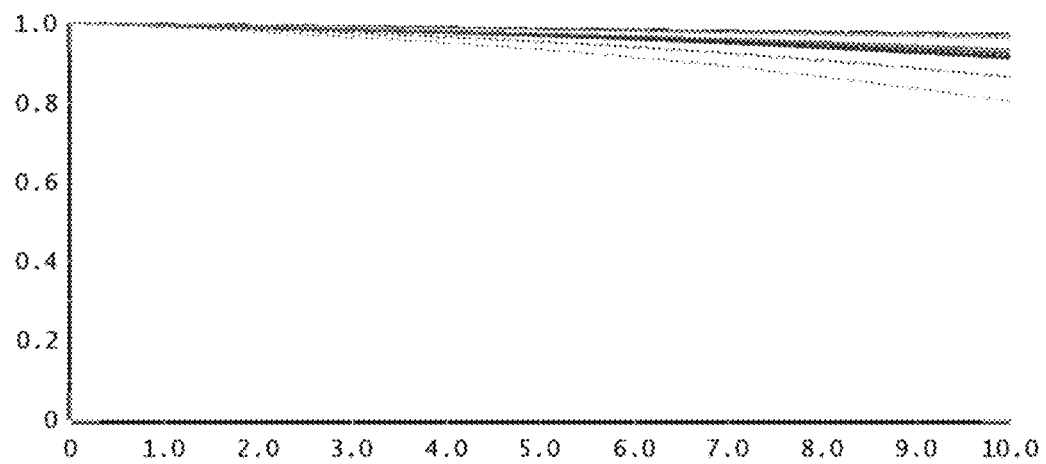
FIG. 18 is a schematic diagram of a modulation transfer function (MTF) of the eyepiece optical system according to Embodiment 5 of the present invention.
Figure 19:
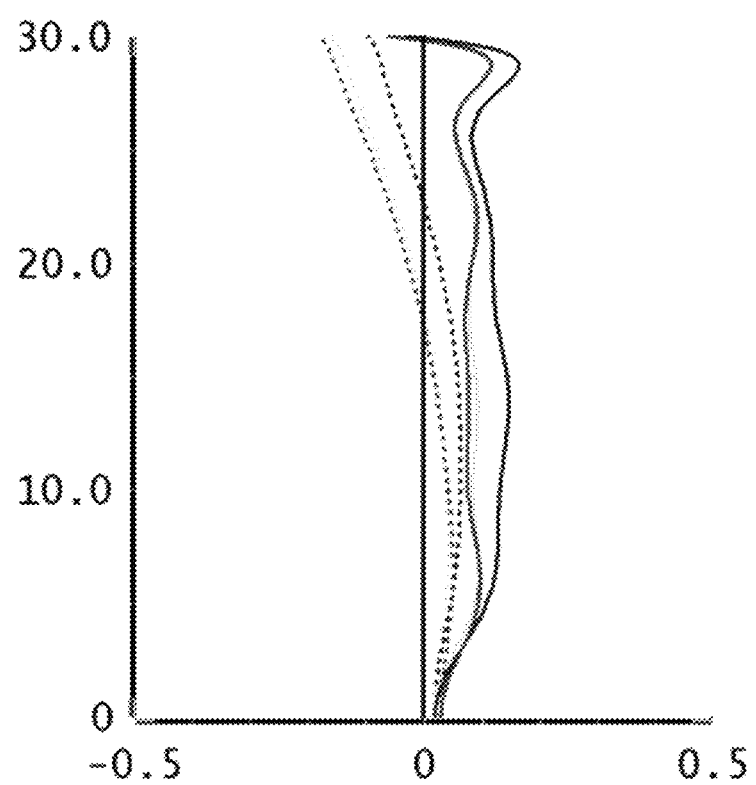
FIG. 19 is a schematic diagram of field curvature of the eyepiece optical system according to Embodiment 5 of the present invention.
Figure 20:
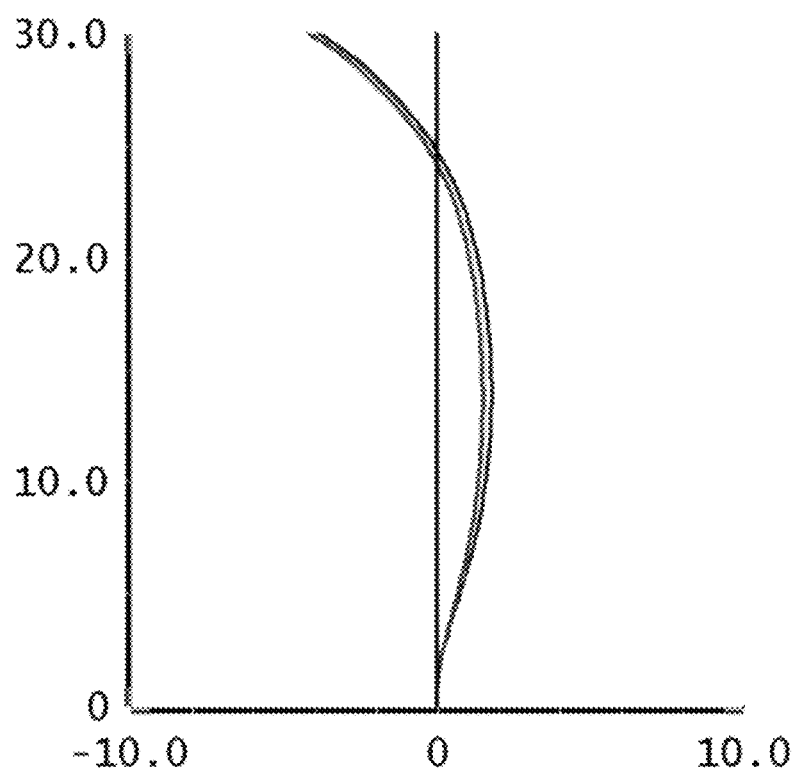
FIG. 20 is a schematic diagram of distortion of the eyepiece optical system according to Embodiment 5 of the present invention.

FIG. 18, FIG. 19, and FIG. 20 respectively show diagrams of the optical transfer function (MTF) curve, field curvature, and distortion of the eyepiece optical system according to Embodiment 5 of the present invention, which reflect that, while ensuring a large field of view, the schematic diagram of the transfer function MTF has a resolution value greater than 0.8 at 10 lp. As can be concluded from the above data, the optical system has a high imaging quality with minimal field curvature and optical distortion.

The data of the above Embodiment 1 to Embodiment 5 all meet the parameter requirements recorded in the summary present invention, and the results are shown in Table 6 as follows:

TABLE 6

| | $f_1/F$ | $F_2/F$ | $F_3/F$ | $F_4/F$ | $F_5/F$ | $F_6/F$ | $f_3/f_1$ | $F_4/f_1$ | $F_5/f_2$ |
|---|---|---|---|---|---|---|---|---|---|
| Embodiment 1 | 1.41 | −1.57 | 1.69 | 1.25 | −1.20 | −3.02 | 1.20 | 0.89 | 0.76 |
| Embodiment 2 | 0.87 | −0.61 | 1.45 | 1.08 | −1.51 | 44.84 | 1.67 | 1.24 | 2.46 |
| Embodiment 3 | 0.92 | −0.69 | 1.21 | 1.24 | −1.24 | 52.00 | 1.32 | 1.34 | 1.80 |
| Embodiment 4 | 1.24 | −0.99 | 1.20 | 1.47 | −1.27 | −15.7 | 0.97 | 1.18 | 1.28 |
| Embodiment 5 | 0.95 | −0.62 | 1.70 | 1.09 | −3.70 | 19.43 | 1.78 | 1.14 | 6.01 |

The present invention further provides a head-mounted display device, including a micro-image display and an eyepiece, the eyepiece being located between human eyes and the micro-image display, wherein the eyepiece is the eyepiece optical system according to any one of the foregoing items.

Further, the micro-image display is an organic electroluminescent device or a transmissive liquid crystal display.

Further, the head-mounted display device includes two identical eyepiece optical systems arranged symmetrically.

In the specific implementation and application process, the display content on the micro-image display is viewed by the observer's left and right eyes respectively through the eyepiece optical system, forming a clear and magnified visual experience. The observer can view large-format images having full-frame high-definition, no distortion, and uniform image quality through the head-mounted display device, thereby achieving the visual experience with a high sense of presence.

In this embodiment, the eyepiece optical system of the head-mounted display device has advantages such as a compact structure, small size, large field of view, and high optical resolution. The eyepiece optical system adopts a structure of six lenses, wherein the first lens, the second lens, the third lens, the fourth lens, and the fifth lens are arranged in a "positive, negative, positive, positive, negative" combination, as well as focal length combinations between the various lenses and material properties, which effectively alleviates the defects of the prior art, and has a better aberration correction ability and better processability, thereby achieving performance indicators such as a large field-of-view angle, low distortion, and high optical resolution, reducing the manufacturing difficulty, manufacturing cost, and product weight of the eyepiece optical system, and greatly improving the optical performance of the system and the user experience of the product. Observers can view large-format images having full-frame high-definition, no distortion, and uniform image quality through the eyepiece optical system of the present invention, thereby achieving the visual experience with a high sense of presence.

It should be understood that, for a person of ordinary skill in the art, improvements or changes may be made according to the above descriptions, and all these improvements and changes shall fall within the protection scope of the claims in the present invention.

What is claimed is:

1. An eyepiece optical system, comprising a first lens, a second lens, a third lens, a fourth lens, a fifth lens, and a sixth lens arranged coaxially and sequentially in an optical axis direction from an observation side of human eyes to a micro-image display;
wherein an effective focal length of the first lens is $f_1$, and $f_1$ is a positive value, an effective focal length of the second lens is $f_2$, and $f_2$ is a negative value, an effective focal length of the third lens is $f_3$, and $f_3$ is a positive value, an effective focal length of the fourth lens is $f_4$, and $f_4$ is a positive value, an effective focal length of the fifth lens is $f_5$, and $f_5$ is a negative value, an effective focal length of the sixth lens is $f_6$, and an optical focal length of the eyepiece is F, and $f_1$, $f_2$, $f_3$, $f_4$, $f_5$, $f_6$, and F meet the following relational expressions (1), (2), (3), (4), (5), and (6):

$$0.86 \leq f_1/F \leq 1.42; \quad (1)$$

$$-1.57 \leq f_2/F \leq -0.61; \quad (2)$$

$$1.20 \leq f_3/F \leq 1.70; \quad (3)$$

$$1.07 \leq f_4/F \leq 1.48; \quad (4)$$

$$-3.70 \leq f_5/F \leq -1.19; \quad (5)$$

$$-15.65 \leq f_6/F \leq 52.00; \quad (6)$$

material properties of the various lenses in the eyepiece optical system meet the following relational expressions (7) and (8):

$$1.53 \leq Nd \leq 1.89; \quad (7)$$

$$20.40 \leq Vd \leq 63.96; \quad (8)$$

wherein Nd is a refractive index of each lens in the eyepiece optical system on a d-line, and Vd is an Abbe number of each lens in the eyepiece optical system on the d-line; and the effective focal length of the sixth lens is $f_6$, and $f_6$ meets the following relational expression (13):

$$46.61 \leq |f_6|. \quad (13)$$

2. The eyepiece optical system according to claim 1, wherein the effective focal length of the first lens is $f_1$, the effective focal length of the third lens is $f_3$, the effective focal length of the fourth lens is $f_4$, and $f_1$, $f_3$, and $f_4$ meet the following relational expressions (9) and (10):

$$0.96 \leq f_3/f_1 \leq 1.78; \quad (9)$$

$$0.88 \leq f_4/f_1 \leq 1.35. \quad (10)$$

3. The eyepiece optical system according to claim 1, wherein the effective focal length of the second lens is $f_2$, the effective focal length of the fifth lens is $f_5$, and $f_2$ and $f_5$ meet the following relational expression (11):

$$0.76 \leq f_5/f_2 \leq 6.10. \quad (11)$$

4. The eyepiece optical system according to claim 1, wherein the first lens is a biconvex lens.

5. The eyepiece optical system according to claim 1, wherein the second lens, the third lens, the fifth lens, and the sixth lens are all biconcave lenses, optical surfaces of the second lens and the third lens are all convex towards the micro-image display side, and optical surfaces of the fifth lens and the sixth lens are all convex towards the human eye side.

6. The eyepiece optical system according to claim 1, wherein an optical surface of the fourth lens close to the human eye side is convex towards the human eye side.

7. The eyepiece optical system according to claim 1, wherein a curvature radius of the optical surface of the sixth lens close to the human eye side is $R_{61}$, and a curvature radius of the optical surface of the sixth lens away from the human eye side is $R_{62}$, and $R_{61}$ and $R_{62}$ meet the following relational expression (12):

$$0.99 \leq R_{61}/R_{62} \leq 1.49. \quad (12)$$

8. The eyepiece optical system according to claim 1, wherein the first lens, the second lens, the third lens, the fourth lens, the fifth lens, and the sixth lens are made of a plastic resin material or a glass material.

9. The eyepiece optical system according to claim 1, wherein the optical surfaces of the first lens, the second lens, the third lens, the fourth lens, the fifth lens, and the sixth lens are all even-order aspherical surfaces, and the even-order aspherical surfaces meet the following relational expression (14):

$$z = \frac{cr^2}{1+\sqrt{1-(1+k)c^2r^2}} + \alpha_2 r^2 + \alpha_4 r^4 + \alpha_6 r^6 + \cdots; \quad (14)$$

wherein z is a vector height of the optical surface, c is a curvature at an aspherical vertex, k is an aspherical coefficient, $\alpha_2$, $\alpha_4$, $\alpha_6$, . . . are coefficients of various orders, and r is a distance coordinate from a point on a curved surface to an optical axis of the lens system.

10. A head-mounted display device, comprising a micro-image display and an eyepiece, the eyepiece being located between human eyes and the micro-image display, wherein the eyepiece is the eyepiece optical system according to claim 1.

11. The head-mounted display device according to claim 10, wherein the micro-image display is an organic electroluminescent device or a transmissive liquid crystal display.

12. The head-mounted display device according to claim 10, wherein the head-mounted display device comprises two identical eyepiece optical systems arranged symmetrically.

* * * * *